(12) United States Patent
Bauer et al.

(10) Patent No.: US 12,043,533 B2
(45) Date of Patent: Jul. 23, 2024

(54) FILLING SYSTEM FOR LIQUID PRODUCTS AND METHOD FOR FILLING LIQUID PRODUCTS INTO BOTTLES

(71) Applicant: Krones AG, Neutraubling (DE)

(72) Inventors: Sascha Bauer, Woerth an der Donau (DE); Christian Holzer, Schierling (DE); Bruno Landler, Neutraubling (DE); Christian Stoiber, Michelsneukirchen (DE); Franz Lautenschlager, Barbing (DE); Konrad Senn, Alteglofsheim (DE); Johannes Bauer, Ergoldsbach (DE); Stefan Poeschl, Sinzing (DE); Ludwig Scheidler, Siegenburg (DE); Juergen Koller, Walderbach (DE)

(73) Assignee: KRONES AG, Neutraubling (DE)

( * ) Notice: Subject to any disclaimer, the term of this patent is extended or adjusted under 35 U.S.C. 154(b) by 126 days.

(21) Appl. No.: 17/455,604

(22) Filed: Nov. 18, 2021

(65) Prior Publication Data

US 2022/0153565 A1    May 19, 2022

(30) Foreign Application Priority Data

Nov. 19, 2020   (DE) ..................... 10 2020 130 535.4

(51) Int. Cl.
*B67C 3/24*        (2006.01)
*B29C 49/24*       (2006.01)
(Continued)

(52) U.S. Cl.
CPC ............... *B67C 3/24* (2013.01); *B29C 49/24* (2013.01); *B29C 49/36* (2013.01); *B65C 3/08* (2013.01);
(Continued)

(58) Field of Classification Search
CPC ............... B29C 49/4273; B29C 49/36; B29C 49/42808; B29C 49/24; B29C 49/4205;
(Continued)

(56) References Cited

U.S. PATENT DOCUMENTS 7,261,199 B2 *   8/2007   Hartness ................. B67C 7/004
                                                     198/470.1

FOREIGN PATENT DOCUMENTS

DE   102009041160 A1   3/2011
DE   102010042165 A1   4/2012
(Continued)

*Primary Examiner* — Jacob A Smith
(74) *Attorney, Agent, or Firm* — McCoy Russell LLP

(57) ABSTRACT

A system and method for filling liquid products into bottles are described. The system comprises a machine block with a blow-molding machine for providing a flow of bottles, with a labeler for labeling the flow of bottles, with a first and second transport stretch, each comprising a filler for filling the bottles, and with a distribution unit dividing the labeled flow of bottles to the transport stretches when the transport is fully populated at all circulating labeling positions of the labeler and all circulating filling positions of the fillers. The filling system comprises outflow conveyors downstream of the fillers, with a combining device for combining the transport stretches to form a common outflow for the flow of bottles, thereby reducing the transport speed during filling and subsequent handling of the bottles, as well as problems due to the product in the bottles spilling over during the closure process.

20 Claims, 9 Drawing Sheets

(51) Int. Cl.
*B29C 49/36* (2006.01)
*B65C 3/08* (2006.01)
*B67C 3/00* (2006.01)
*B67C 7/00* (2006.01)
*B29K 67/00* (2006.01)
*B29L 31/00* (2006.01)
*B67C 3/22* (2006.01)

(52) U.S. Cl.
CPC .............. *B67C 3/007* (2013.01); *B67C 7/004* (2013.01); *B29K 2067/003* (2013.01); *B29L 2031/7158* (2013.01); *B67C 2003/227* (2013.01); *B67C 2007/006* (2013.01); *B67C 2007/0066* (2013.01)

(58) Field of Classification Search
CPC ........ B29C 49/42095; B67C 2003/227; B67C 7/004; B67C 2007/006; B67C 2007/0066; B67C 7/0046

USPC .................................. 53/167, 561, 282, 467
See application file for complete search history.

(56) References Cited

FOREIGN PATENT DOCUMENTS

| | | | | |
|---|---|---|---|---|
| DE | 202009019170 U1 | | 7/2017 | |
| DE | 202009019170 U1 | * | 8/2017 | ..... B29C 2949/0715 |
| DE | 102016110016 A1 | * | 11/2017 | ..... B29C 2049/4879 |
| DE | 102016110016 A1 | | 11/2017 | |
| EP | 2439048 A1 | * | 4/2012 | ......... B29C 49/6436 |
| EP | 2439048 A1 | | 4/2012 | |
| FR | 3070970 A1 | | 3/2019 | |
| WO | WO-2013156181 A1 | * | 10/2013 | ............. B65B 3/022 |
| WO | 2018185015 A1 | | 10/2018 | |
| WO | WO-2018185015 A1 | * | 10/2018 | ............... B08B 9/08 |

* cited by examiner

FILLING SYSTEM FOR LIQUID PRODUCTS AND METHOD FOR FILLING LIQUID PRODUCTS INTO BOTTLES

CROSS-REFERENCE TO RELATED APPLICATION

The present application claims priority to German Patent Application No. 10 2020 130 535.4 filed on Nov. 19, 2020. The entire contents of the above-listed application is hereby incorporated by reference for all purposes.

TECHNICAL FIELD

The disclosure relates to a filling system for liquid products, such as beverages, and a method for filling liquid products into bottles.

BACKGROUND AND SUMMARY

Liquid products, such as beverages, are increasingly being filled in filling systems in which the individual production units, treatment units, and inspection units are connected to circulating transport pouches and/or holders exclusively by way of transfer star wheels or similar transport devices. A machine combination that is integrated in this way in terms of transport technology is typically referred to as a machine block. Such a machine block is known, for example, from DE 20 2009 019 170.

In order to be able to process different containers and/or different products simultaneously, it is also known from DE 10 2016 110 016 and FR 3 070 970 to divide a flow of containers directly downstream of a blow-molding machine into two transport stretches and to supply them to two downstream fillers. According to FR 3 070 970, the containers can be supplied alternately to a first and a second filler at a changeover star wheel in order to optionally fill the containers with the same product at both fillers. In DE 10 2016 110 016, the containers are transported in the transport stretches by way of a conveyor belt to the respective filler. In addition, labelers can be arranged in the transport stretches.

In addition to a more flexible filling process, there is also increasing demand for an increase in system performance, i.e. the number of containers that can be filled per unit of time. Not only the filling process, which cannot be shortened arbitrarily for physical reasons, has proven to be limiting, but also the immediately subsequent handling of the filled containers. It has been found that the filled product can spill over with increasing transport speed when changing direction. In addition, the closure process becomes less reliable due to the high circumferential speeds of the system. In the case of correspondingly fast closure processes, the supply of closure caps is also problematic.

It would also be desirable to form the runout of the closed containers on the downstream outflow belts to be more compact, since they must comprise long straight sections on the inlet side in order to slow down the bottles, for example, for a possibly necessary discharge of incorrectly manufactured bottles.

There is therefore a demand for filling systems and methods for filling liquid products in which the bottles can be manufactured and filled in one machine block and at least one of the above-mentioned problems can be alleviated or completely eliminated. In addition, it is desirable to minimize product losses due to malfunctions during such a filling process and to enable the filling system and the method to be operated and controlled as simply and flexibly as possible.

The object posed is satisfied by a filling system. According thereto, it is used to fill liquid products, such as beverages, into bottles or similar containers. For this purpose, the filling system comprises a machine block in which the individual manufacturing units, treatment units, and/or inspection units are integrated in terms of transport technology by way of star-shaped transport device, such as, for example, transfer star wheels.

The machine block comprises a blow-molding machine for the manufacture of bottles and for their provision as a single-lane flow of bottles, a downstream labeler for labeling the flow of bottles, at least one first and second transport stretch, each with a filler for filling the bottles, and a distribution unit for the division of the labeled flow of bottles to the transport stretches when the transport is fully populated in such a way that the bottles can be labeled at all circulating labeling positions of the labeler and can be filled at the same time at all circulating filling positions of the fillers.

The term "all circulating labeling positions of the labeler" means that the labeling positions are fully populated during regular operation. This means that individual, or faulty, containers which, for example, experienced defects in the blow molding process, can also be channeled out. Channeling out individual preforms or containers in the flow of bottles in a more or less regular manner up to the division to the at least one first and second transport stretch for the purpose of creating gaps, where the gap encounters a downstream faulty treatment position (for example, in the filler or closer), is also covered by this term. Such containers can be channeled out upstream of the labeler so that respective gaps pass through the labeler. These gaps then continue to run with the further transport flow. However, it is also conceivable—for instance, if there are only very few gaps in the transport flow—that a gap that has arisen in the transport flow upstream of the two fillers is caught up with in the distribution device upstream of the fillers, so that a gap is closed. Of course, this is only appropriate if the gap was not created in order to deliberately encounter a faulty treatment position in the filler or the closer. Closing the gap would be considerable, for example, if a gap was created by a defective container that was recognized downstream of the blow-molding machine and channeled out.

Furthermore, the filling system comprises outflow conveyors connected downstream of the fillers with a combining device for combining the transport stretches to form a common outflow for the flow of filled bottles. The outflow conveyors and/or the combining device can be part of the machine block or be configured as units connected thereto with a fundamentally independent function.

The machine block can also consist of a blow-molding machine for manufacturing bottles and providing them as a single-lane flow of bottles, a distribution unit for the division of the single-lane flow of bottles into a first and a second transport stretch, each with a filler for filling the bottles. The bottles would then be labeled afterwards when the bottles have left the machine block and are supplied to the labeler or several labelers by way of conveyors.

Due to the fact that the flow of bottles is only divided to the transport stretches after it has been labeled, the equipment complexity for the single-lane production and labeling of the bottles can be minimized upstream of the distribution unit. At the same time, the transport speed in the transport stretches can be reduced as compared to the single-lane flow of bottles, whereby the filling processes can be carried out with comparatively small fillers requiring correspondingly little space and the filled product can be prevented from spilling over. In addition, the supply of closure caps for the subsequent closure process is possible in a more reliable manner, and the closure process itself is more stable. The outflow speed on the outflow conveyors can also be reduced overall as compared to the transport speed of the single-lane flow of bottles. This facilitates the discharge of improperly filled and/or closed containers or generally for service purposes. Overall, the principle not only has a positive effect on the operation of the customer's system, but also on commissioning and setting the machines at the construction site.

The transport being fully populated is to be understood to mean that the bottles can be transported from the blow-molding machine up to and including the fillers without omitting any transport positions and treatment positions. However, individual transport positions and treatment positions can be left free in a selective manner if there is a malfunction, for example, at one of the fillers. Selectively omitting transport positions and treatment positions is possible, for example, in that bottles from the single-lane flow of bottles or from the partial flow of a transport stretch formed therefrom are discharged, or in that, for example, only every second circulating blow position/blow mold of the blow-molding machine is populated with a preform.

The combining device enables the capacity to be increased by connecting the fillers in parallel when filling the same product in both fillers. The bottles filled in the same manner can then run out as a uniform flow of bottles. The space requirement for the fillers and the bottle outflow can be kept comparatively small.

In some embodiments, the filling system further comprises a bypass device for selectively bypassing or inhibiting the combining device in order to provide separate outflows for the transport stretches. The bottles can then be made available at the outflow in a sorted manner when filling different products in the individual fillers. The filling system can then be used flexibly for filling a uniform product in all fillers as well as for filling different products at the same time.

The distribution device can comprise a division star wheel for alternately transferring every second bottle of the flow of bottles to the first and the second transport stretch.

The division star wheel may comprise clamps that can be actively opened by way of actuating elements circulating thereon and associated stationary actuating elements. The actuating elements associated with the first transport stretch are then arranged on a first common actuation plane and the actuating elements associated with the second transport stretch are arranged on a second common actuation plane above or below the first actuation plane. The actuating elements are then arranged in such a way that they can be actuated independently of one another with respect to the actuating planes.

In other words, the stationary actuating element of the first actuation plane interacts only with the circulating actuating elements of the first actuation plane and the stationary actuating element of the second actuation plane only interacts with the circulating actuating elements of the second actuation plane. This enables a space-saving and easy-to-construct flow division by selectively opening the clamps either at a first transfer point to the first transport stretch or at a second transfer point to the second transport stretch.

The circulating actuating elements are, for example, turning locks that can be rotated about vertical axes. The stationary actuating elements are configured, for example, as actuating cams which, when they collide with the turning locks, rotate them about the vertical axes in order to actuate the clamps. This is known in principle from transfer star wheels for the actuation in a single actuation plane.

In principle, division star wheels of a different configuration would also be conceivable, for example, a changeover star wheel with a switchable control curve, a pushing star wheel with radially displaceable clamps, a transfer star wheel with a circumferentially extending linear motor system for individual clamps or the like.

The transport stretches can each comprise at least one separation delay star wheel for reducing a first transport separation during/immediately prior to the division of the flow of bottles to a smaller, second transport separation when the bottles are filled.

The separation delay star wheel may then be arranged immediately following the division star wheel, i.e. receives the bottles from the latter and then changes the first transport separation with a further rotation about itself and creates the second transport separation.

In principle, a separation delay star wheel can be configured as a changeover star wheel with a switchable control curve, a pushing star wheel with radially displaceable clamps, a transfer star wheel with a circumferentially extending linear motor system for individual clamps.

This enables a comparatively compact division of the flow of bottles while at the same time adapting the transport separation and having comparatively high transport speeds. The transport separation is there adapted while maintaining a separation of the containers, i.e. at a distance from one another.

In certain embodiments, the machine block further comprises a bottle buffer for the single-lane flow of bottles, optionally branching off between the blow-molding machine and the labeler as a result of machine control, and/or a discharge device for the transport stretches, each optionally branching off between the distribution device and the filler as a result of machine control.

In the event of a malfunction in one of the fillers, the bottles associated therewith can then be temporarily stored (buffered) prior to labeling and/or discharged after labeling. This enables the filling operation to be maintained in the at least one properly operating filler. In addition, bottles buffered in this way can be channeled into the single-lane flow of bottles when filling operations are resumed. This makes it possible to reduce overall product loss as a result of malfunctions at individual fillers.

The machine block can further comprise at least one discharge device that is arranged at the distribution device or between the latter and one of the fillers and that is configured and machine-controlled in such a way that bottles associated with one or the other filler can each be selectively discharged. The discharge device is arranged, for example, at the distribution star wheel, at at least one transfer point from the latter to a subsequent separation delay star wheel, at the separation delay star wheel, and/or downstream thereof. The number of bottles that are present downstream of the discharge device and consequently no longer dischargeable can thereby be reduced/minimized so that the fillers can be switched off relatively quickly in case of malfunction.

In some embodiments, the filling system further comprises at least one collection container, which is configured to receive bottles discharged by way of the discharge device and to empty them from outside a machine protection region comprising the distribution device and/or at least one of the fillers, for instance, without operator intervention. This promotes uninterrupted operation of the one filler while at the same time the other filler is malfunctioning.

In some embodiments, the filling system further comprises a central product distributor for supplying the fillers with product to be filled from a common product store, such as a storage tank, and/or a central closure cap distributor for supplying closing machines associated with the fillers with closure caps from a common closure cap store, such as a storage container.

The product distributor is, for example, a so-called valve node via which the product is directed to the individual filling valves of the fillers.

The closure cap distributor is, for example, a cascade-like arrangement of inflow channels that lead from the storage container to the closing machines.

Such distribution of product and/or closure caps reduces the space required for the product stock and closure cap stock and simplifies the provision and the replenishment of the respective stocks.

The filling system may also comprise a control device for the common control of the fillers and/or for control synchronization of control units present at the fillers. The control synchronization comprises, for example, type-specific transfer of parameters, such as relating to a product to be uniformly filled. This simplifies controlling and operating the fillers.

For example, type parameters can be transferred from one filler to the other so that only one (common) input or similar operating step is required. The fillers can nonetheless each comprise an independent operating unit and/or display unit. An input made there can then be duplicated/mirrored to the respective other filler.

Such common control enables the duplicated fillers (in the sense of structurally identical but possibly adapted to their arrangement in the machine block, for example, with regard to downstream transfer star wheels) to be represented and/or addressed as a single treatment unit (filler) in the operating concept of the machine block. The association in terms of control technology of the labeling positions (bottle holders) of the labeler and the filling positions (filling elements) of the fillers is carried out, for example, by assigning corresponding shift registers to the respective control devices.

The common control device and/or the individual control units of the fillers can be arranged, for example, in a common switchgear cabinet.

The common control of the filler enables a unique association of the blowing positions (blow molds), labeling positions (bottle holders), and filling positions (filling elements) used for the respective bottle in order to enable the filled bottles to be tracked through the value creation chain of the filling system. A specific labeling unit can also be associated with the labeling positions, for example, a first labeling unit to the odd-numbered labeling positions and a second labeling unit to the even-numbered labeling positions.

The filling system, such as the common control device, may comprise a central base device for controlling the inspection technology for the outflows of both transport stretches. Such a control system can have the following functions, which are known in principle: full product control for fillers and closing machines, for example comprising: filling level control (using high-frequency, infrared, camera, gamma or X-ray technology); closure and locking ring detection (using sensor and camera technology); filler management; production management; quality management; security management; and/or adjustment of guide rails and/or inspection level.

In some embodiments, the filling system further comprises a machine protection device with a common protective circuit for shielding rotating assemblies of the fillers and also the distribution device from operator intervention. The common protective circuit comprises several separators separating the protective circuit so that the rotating assemblies of all fillers and possibly the distribution device are stopped together in the event of a malfunction and/or attempted operator intervention. As a result, the machine protection device can be set up and controlled comparatively easily.

However, it is also conceivable to provide separate machine protection devices and/or separate protective circuits for the fillers and/or the distribution device. In this case, separation devices would have to be provided for separating the individual protective circuits individually, such as, for example, a separating partition on the inlet side on each filler and a separating partition on the inlet side at the entry to the distribution unit. In this case, it would be possible, for example, to enable the intervention at one of the fillers in the event of a malfunction, while the other filler continues to produce and is populated accordingly by the distribution unit. In other words, in this case the protection against intervention would be fully maintained for the filler and distribution device that is still in operation.

In some embodiments, the filling system further comprises a furnace for preforms connected upstream of the blow-molding machine with a locking star wheel on the inlet side for the controlled release and blocking of the supply of preforms, where the locking star wheel is driven to rotate by way of a stepper motor. The stepper motor enables true-to-cycle release and supply, on the one hand, and blocking and retention of individual preforms, on the other hand, for example, if none or only every second blow position of the blow-molding machine is to be populated with a preform.

Due to the precise control and motion of the stepper motor, for example, in comparison to known pneumatic locking units, the control signals for the stepper motor can be entered directly into the respective machine shift register and thus enable controlling the supply of preforms without the need for additional sensors for verifying the presence of preforms or bottles. In addition, there is no need for the set up and inspection of respective sensors which previously had to be precisely set and frequently inspected due to the relatively high transport speeds.

In some embodiments, a method is used to fill liquid products, such as beverages, into bottles or similar containers. The bottles are manufactured in a blow-molding machine and supplied as a single-lane flow of bottles to a labeler, labeled there at all circulating labeling positions, and then divided onto at least one first and second transport stretch, and each filled in a filler integrated therein. In addition, the bottles are transported in a machine block from the manufacture to the filling process, and the labeled flow of bottles is divided onto the transport stretches when the transport is fully populated such that the bottles are filled at all circulating filling positions of the fillers.

After uniform filling in the fillers, i.e. with the same product, the bottles can again be combined to form a flow of bottles running out jointly.

If the filling processes in the fillers differ from one another with regard to the product, then the bottles can also run out as separate flow of bottles.

A first transport separation in the transport stretches created by the division of the single-lane flow of bottles can be reduced to a second transport separation for filling the bottles by way of a separation delay.

The fillers may be commonly controlled by the operator by entering uniform type parameters and using them in the fillers by way of an automated transfer of type parameters from one common control device, such as from one filler, to the other.

In the event of a malfunction in one of the fillers, the preforms associated therewith can be delayed before they are heated or then channeled out thereafter, and/or the bottles associated therewith are temporarily stored prior to labeling and/or discharged from the associated transport stretch after labeling and prior to filling, where at least the already manufactured and/or labeled bottles are filled in the properly operating filler.

In the event of a malfunction in one of the fillers, bottles associated therewith can be discharged from the respective partial flow upstream of the filler and/or in the region of a distribution star wheel for the division of the flow of bottles onto the partial flows.

BRIEF DESCRIPTION OF THE FIGURES

Embodiments are shown by way of the drawings, where.

DETAILED DESCRIPTION

Figure 1:
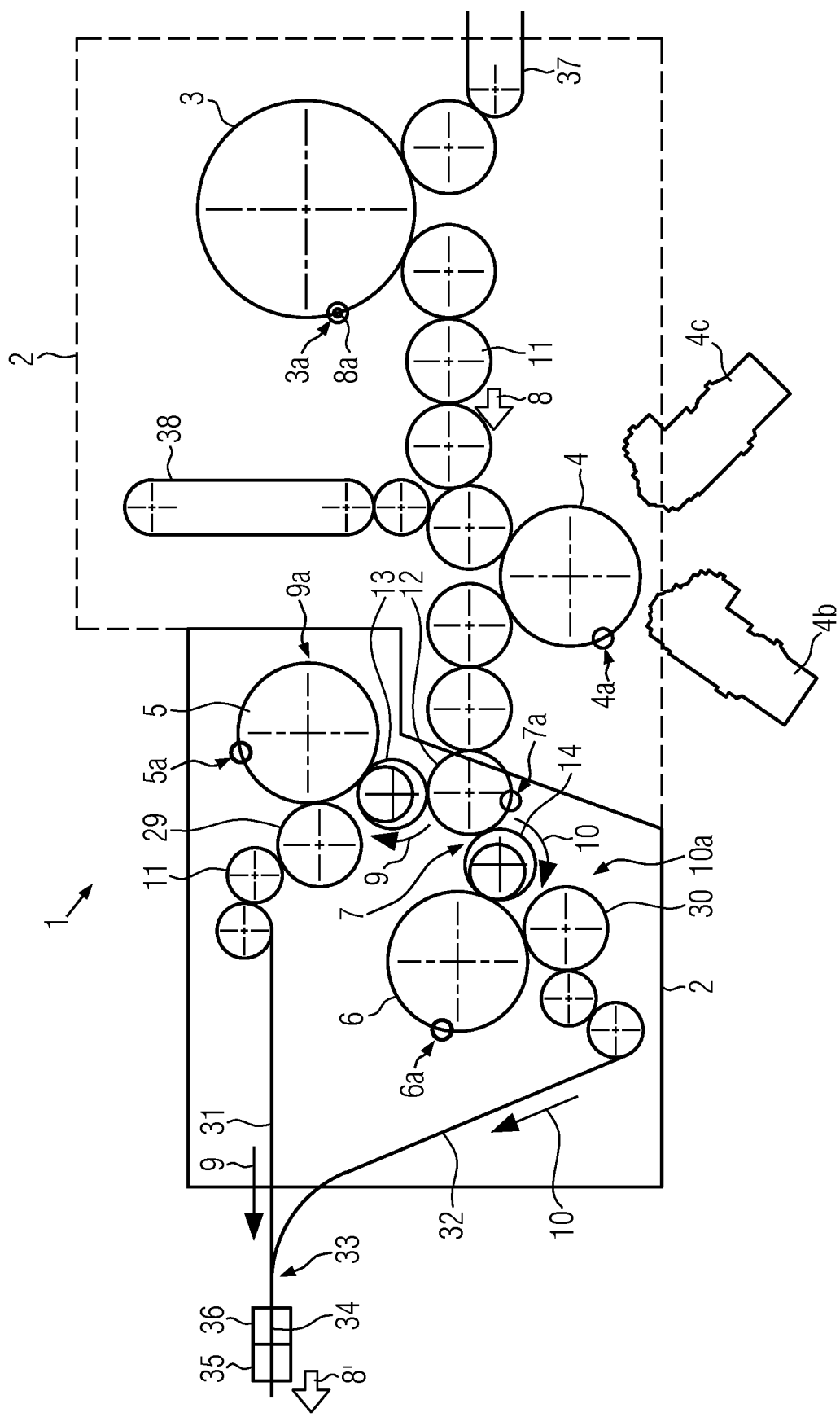
FIG. 1 shows a schematic top view onto the filling system according to a first embodiment.

As can be seen in FIG. 1, filling system 1 according to a first embodiment comprises a machine block 2 with a blow-molding machine 3, a labeler 4 connected downstream thereof and two fillers 5, 6 as well as a distribution device 7 for dividing a single-lane flow of bottles 8 onto a first partial flow 9 along a first transport stretch 9a to first filler 5 and onto a second partial flow 10 along a second transport stretch 10a to second filler 6.

Single-lane flow of bottles 8 consists of bottles 8a (only one of which is shown) that are produced in blow-molding machine 3 at continuously circulating blowing positions 3a and that circulate in labeler 4 at labeling positions 4a (only one of which is shown) continuously in a manner known in principle and are there labeled by a first or second labeling unit 4b, 4c. For example, bottles 8a with an odd ordinal number in flow of bottles 8 are labeled by one labeling unit 4b and bottles 8a with an even ordinal number in flow of bottles 8 are labeled by other labeling unit 4c. Distribution device 7 accordingly comprises continuously circulating transport positions 7a (only one of which is shown).

Machine block 2 is characterized in that single-lane flow of bottles 8 as well as partial flows 9, 10 formed therefrom are transported separated throughout, i.e. at a defined distance from one another, by star-shaped transport devices 11 such as transfer star wheels. This results in an integrated construction of blow-molding machine 3, labeler 4, fillers 5, 6 and distribution device 7.

Distribution device 7 may comprise a division star wheel 12 and, in some embodiments, directly adjoining it, separation delay star wheels 13, 14.

Figure 2:
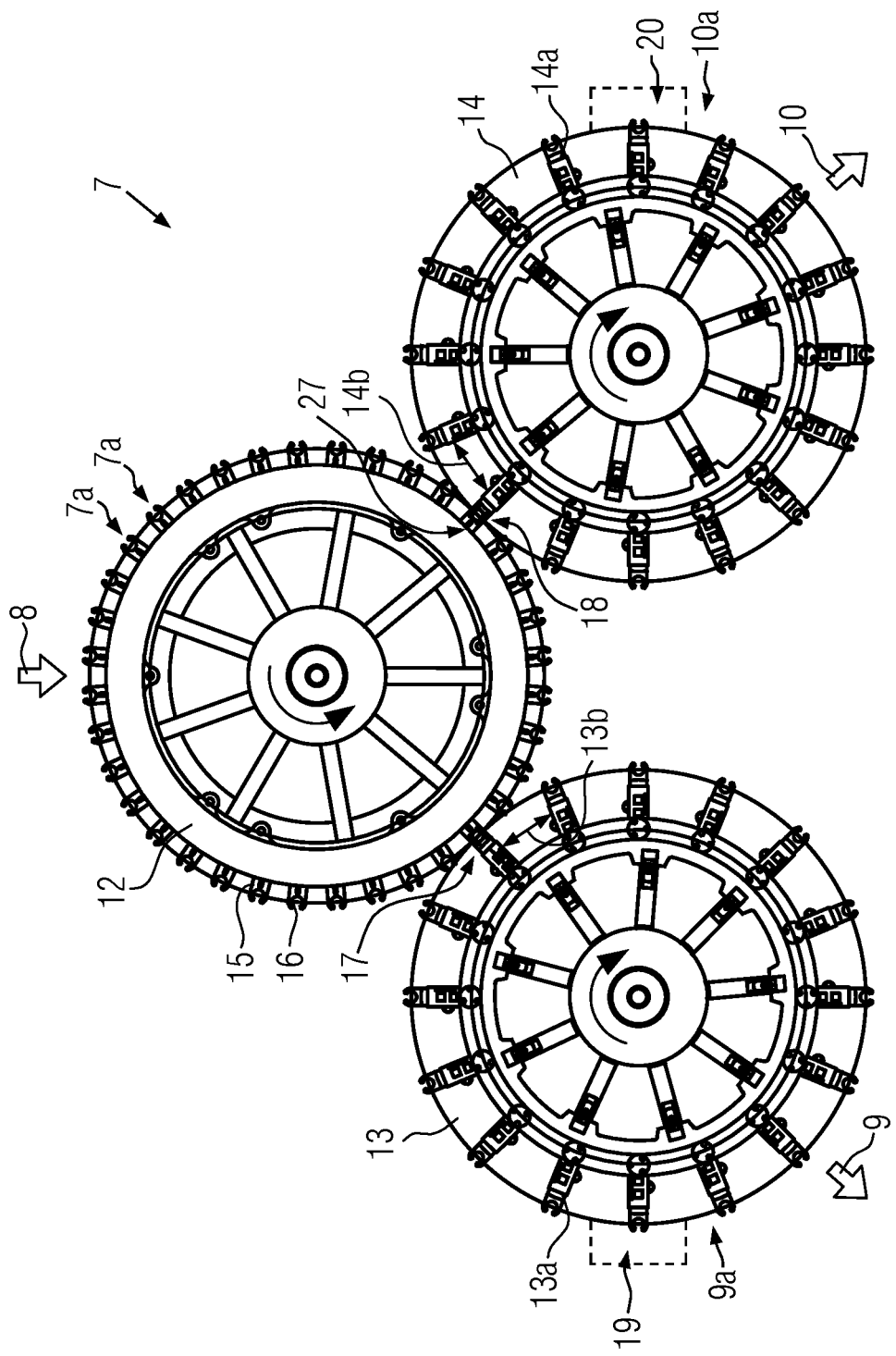
FIG. 2 shows a schematic top view onto a distribution device.

As can be seen in FIG. 2 in this regard, division star wheel 12 can comprise thereon a plurality of first clamps 15 distributed uniformly around the circumference which transfer every second bottle 8a of single-lane flow of bottles 8, for example, bottles with an odd ordinal number, to first transport stretch 9a to form first partial flow 9, and second clamps 16 which transfer bottles 8a arranged therebetween in flow of bottles 8, for example, those with an even ordinal number, to second transport stretch 10a to form second partial flow 10. The totality of clamps 15, 16 corresponds to transport positions 7a of distribution device 7 for bottles 8a. Separation delay star wheels 13, 14 comprise clamps 13a, 14a that correspond to every second transport position 7a.

As also shown in FIG. 2 in this regard, separation delay star wheels 13, 14 comprise a first transport separation 13b, 14b when bottles 8a are transferred which corresponds to twice the transport separation of division star wheel 12 in the sense that clamps 13a of first separation delay star wheel 13 are associated with first clamps 15 of division star wheel 12 and clamps 14a of second separation delay star wheel 14 are associated with second clamps 16 of division star wheel 12 (or vice versa). Separation delay star wheels 13, 14 are configured to reduce the transport separation of first and second partial flow 9, 10 compared to first transport separation 13b, 14b to a second transport separation (not shown) which can correspond to the transport separation (not shown) of filling positions 5a, 6a of fillers 5, 6.

First clamps 15 of division star wheel 12 are opened in a controlled manner at a first transfer point 17 with separation delay star wheel 13, as described hereafter, second clamps 16 of division star wheel 12 accordingly at a second transfer point 18 with second separation delay star wheel 14 and bottles 8a are there each transferred to transport stretches 9a, 10a.

An optional first discharge device 19 for first partial flow 9 and an optional second discharge device 20 for second partial flow 10 for the selective discharge of bottles 8a from transport stretch 9a, 10a in the event of malfunction of respectively associated filler 5, 6 are further schematically indicated. It would also be conceivable to arrange a discharge device (not shown in FIG. 2) between labeler 4 and distribution device 7.

Figure 3:
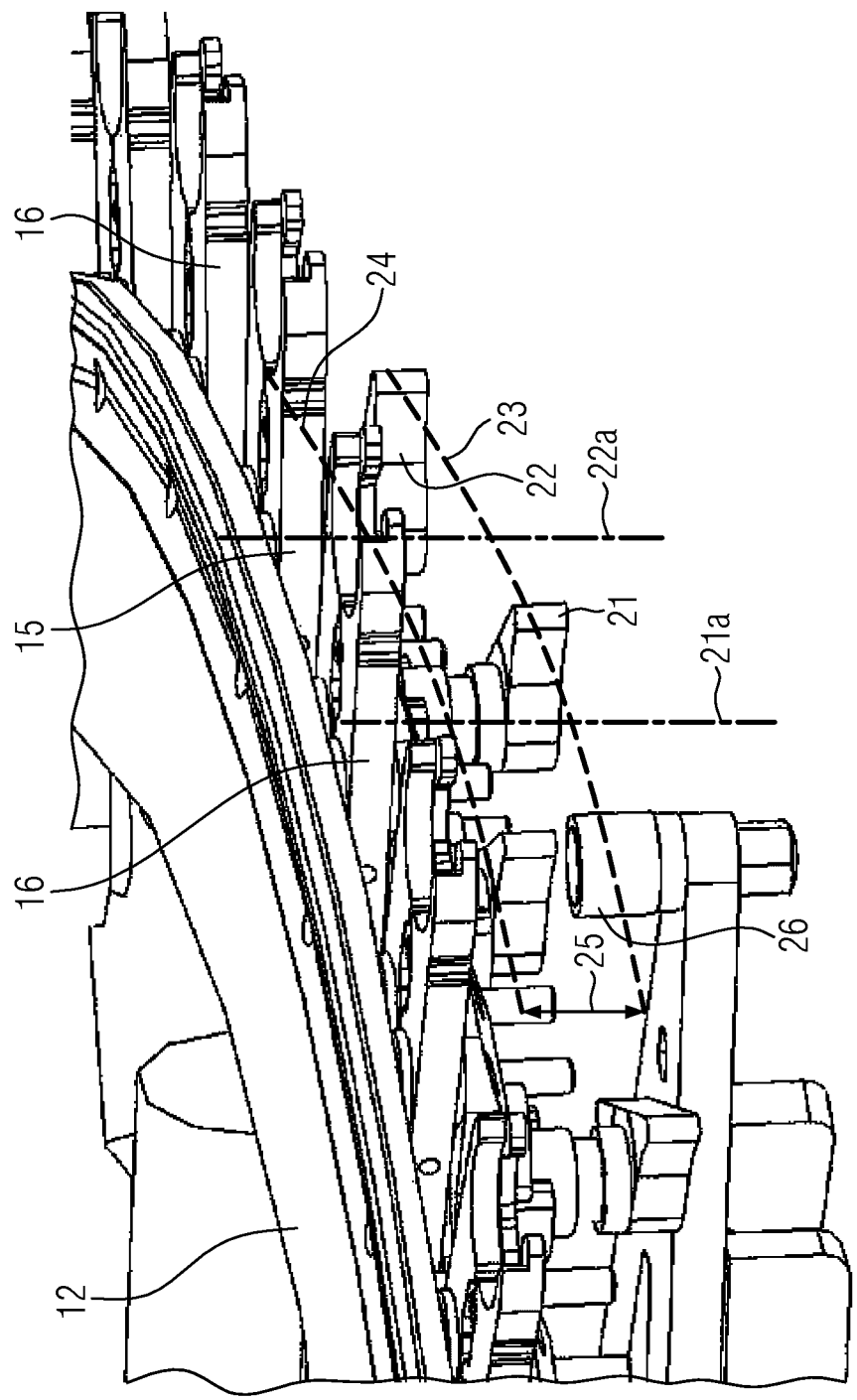
FIG. 3 shows a partial side view of a division star wheel.

FIG. 3 shows an actuating mechanism for first and second clamps 15, 16. Accordingly, division star wheel 12 comprises a first circulating actuating element 21 associated with each first clamp 15 and a circulating second actuating element 22 associated with each second clamp 16. Actuating elements 21, 22 can be configured as turning locks which are formed to be rotatable about vertical axes 21a, 22a, the rotation of which (depending on the direction of rotation) opens (or closes) respectively associated clamps 15, 16.

The turning locks (circulating actuating elements 21) associated with first clamps 15 are arranged in a first common actuation plane 23, while the turning locks (circulating actuating elements 22) associated with second clamps 16 are arranged in a second actuation plane 24 that is decoupled therefrom upwardly (or downwardly) in terms of control technology.

This is to mean that distance 25 between actuation planes 23, 24 is so large that at least one stationary (non-circulating) actuating element 26, which is arranged in first actuation plane 23 and is configured, for example, as a control cam, actuates only the turning locks of first actuation plane 23 and thus first clamps 15 and at least one stationary actuating element 27 arranged in second actuation plane 24 (for example a control cam hidden in FIG. 2) actuates only turning locks 22 of second actuation plane 23 and thus second clamps 16.

Stationary actuating elements 26, 27 (control cams) for opening the clamps 15, 16 are arranged on division star wheel 12 in the region of transfer points 17, 18.

Such an actuation mechanism with circulating actuating elements 21, 22 and stationary actuating elements 26, 27 enables a relatively simple construction and a space-saving division of flow of bottles 8. Reliably switching clamps 15, 16 in the region of respective transfer point 17, 18 is therefore given at high transport speed.

FIG. 1 shows closing machines 29, 30 each associated with fillers 5, 6 for closing bottles 8a in respective partial flow 9, 10 as well as partial outflow conveyors 31, 32 that are connected downstream thereof by way of transfer star wheels 11 and that substantially form the terminations of transport stretches 9a, 10a on the outflow side.

Transport stretches 9a, 10a or partial outflow conveyors 31, 32, respectively, are combined at a combining device 33 (also indicated only schematically), such as a track switch or a similar transport union, to form a common outflow 8' of bottles 8a, for example, on a common outflow conveyor 34 which is indicated only schematically.

Outflow 8' normally consists of bottles 8a of original single-lane flow of bottles 8, but, in contrast, can be multi-lane and comparatively slower.

In the region of common outflow conveyor 34, for example, a discharge table 35 can be arranged which is used, for example, for the service discharge of bottles 8a from outflow 8'. Alternatively, separate discharge tables 35 could also be provided on each of partial outflow conveyors 31, 32. For example, an associated collection container (not shown) for discharged bottles 8a is then present at each discharge table 35.

For example, an inspection unit 36, presently illustrated at common outflow conveyor 34 by way of example, can be associated with each discharge table 35. Alternatively, separate inspection units 36 for first and second transport stretch 9a, 10a can also be arranged downstream of closing machines 29, 30. In contrast, a discharge table 35 and an inspection unit 36 for common outflow 8', however, allow for the complexity of the equipment to be minimized.

As also shown in FIG. 1, filling system 1 further comprises a heating module 37 for preforms 8b associated with blow-molding machine 3 on the inlet side as well as optionally a buffer table 38 associated with blow-molding machine 3 on the outlet side for temporarily storing bottles 8a of single-lane flow of bottles 8.

Buffer table 38 can be used, for example, in the event of a malfunction of one of fillers 5, 6 to channel out bottles 8a associated therewith from flow of bottles 8 prior to being labeled and to store them temporarily for later labeling and filling.

This makes it possible, for example, to run blow-molding machine 3 and upstream heating module 37 empty, while bottles 8a associated with a properly functioning filler 5, 6 can still be labeled and filled and closed in respective partial flow 9, 10.

Due to a malfunction in one of fillers 5, 6, bottles 8a that cannot be filled can then still be properly manufactured from preforms 8b already present in heating module 37 and in blow-molding machine 3 and be channeled onto buffer table 38 for later further processing in order to minimize production waste.

A production operation with the omission of a filler 5, 6 taken out of operation could in principle also be continued after preforms 8b associated therewith have been completely processed and bottles 8a produced therefrom have been temporarily stored.

In this case, only every second blow position 3a of blow-molding machine 3 is temporarily populated with a preform 8b and bottles 8a blown therefrom are only guided through labeler 4 and distribution device 7 at every second labeling position 4a or transport position 7a, respectively. Bottles 8a are then only labeled by one of labeling units 4b, 4c.

Such modes of operation are deviations from the regular production operation which nominally takes place in filling system 1 when the transport is fully populated. This means that all circulating labeling positions 4a, transport positions 7a of distribution device 7, and filling positions 5a, 6a are populated with a bottle 8a.

Figure 4:
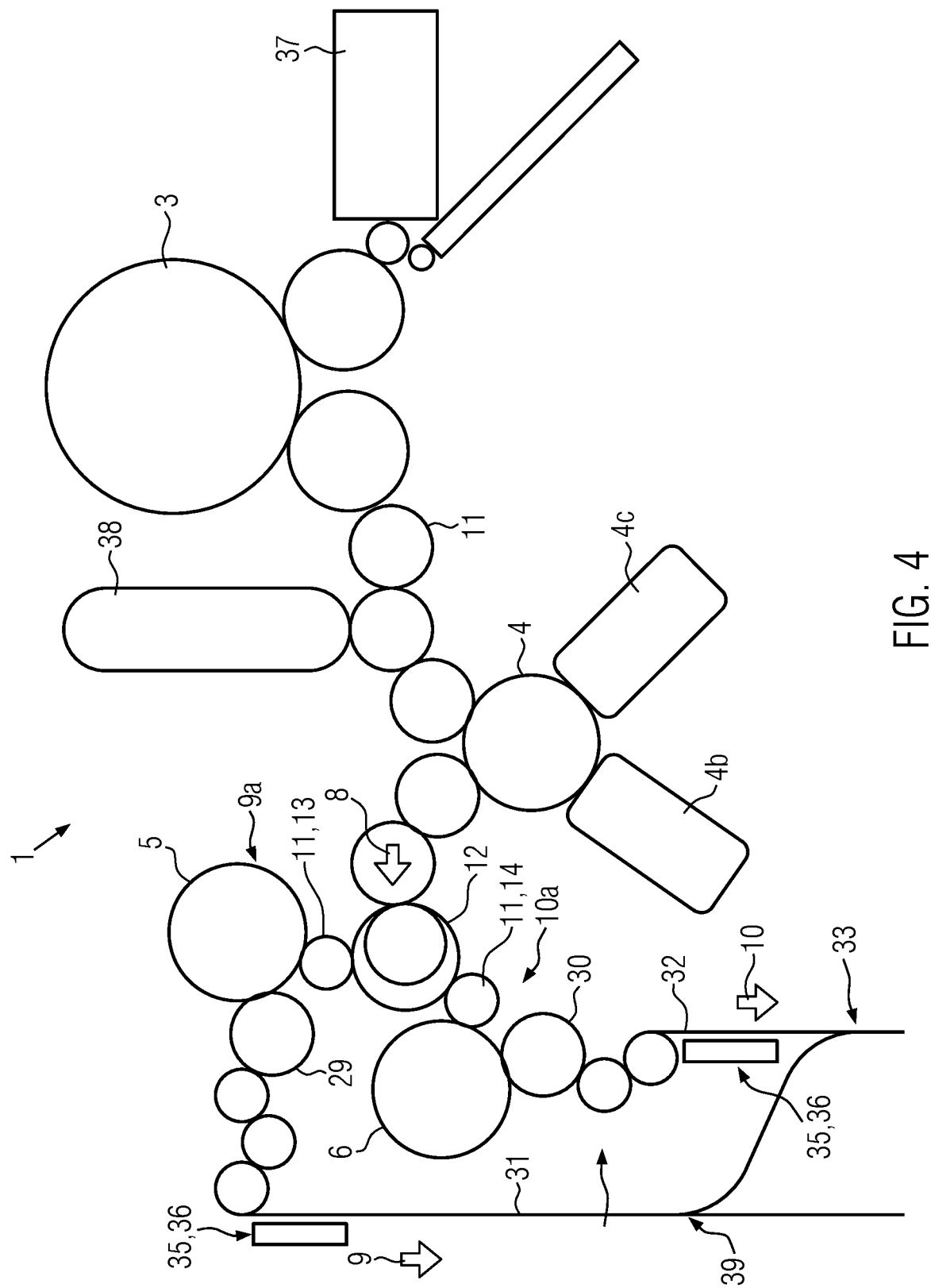
FIG. 4 shows a schematic top view onto the filling system according to a second embodiment.

FIG. 4 shows an alternative configuration of filling system 1, where comparable assemblies and machines are denoted with corresponding reference characters and are therefore not explained again.

In FIG. 4, distribution device 7 is indicated schematically with a division star wheel 12 in the form of a pushing star wheel, a separation delay star wheel, or the like. This is intended to mean that the reference circle diameter and/or the transport separation of distribution star wheel 12 can change as bottles 8a circulate in order to divide labeled flow of bottles 8 into first and second partial flows 9, 10 and thereby, for example, to prevent a collision of clamps 15, 16 of division star wheel 12 with respectively unassigned clamps 13a, 14a of adjoining separation delay star wheels 13, 14 or transfer star wheels 11 and/or to already undertake a separation delay at division star wheel 12.

For this purpose, clamps 15, 16 of division star wheel 12 can be pivoted, displaced, and/or moved circumferentially relative to division star wheel 12 in a suitable manner, i.e. in or opposite to their direction of circulation, in order to transfer bottles 8a to transfer points 17, 18 and in the process to avoid collisions between assemblies that are not associated with one another (which transfer bottles 8a at respective other transfer point 17, 18).

It is also indicated in FIG. 4 that discharge tables 35 and inspection units 36 can also be formed on the outflow side at transport stretches 9a, 10a.

It is also indicated that a bypass device 39, for example, in the form of a track switch, can be present for combining device 33, with which combining device 33 can be bypassed and/or disabled in order to selectively transfer away bottles 8a from transport stretches 9a, 10a as separate partial flows 9, 10, for example, when filling different products in transport stretches 9a, 10a. With the inclusion of combining device 33, however, filled bottles 8a form common outflow 8' which is useful when all bottles 8a are filled uniformly.

Figure 5:
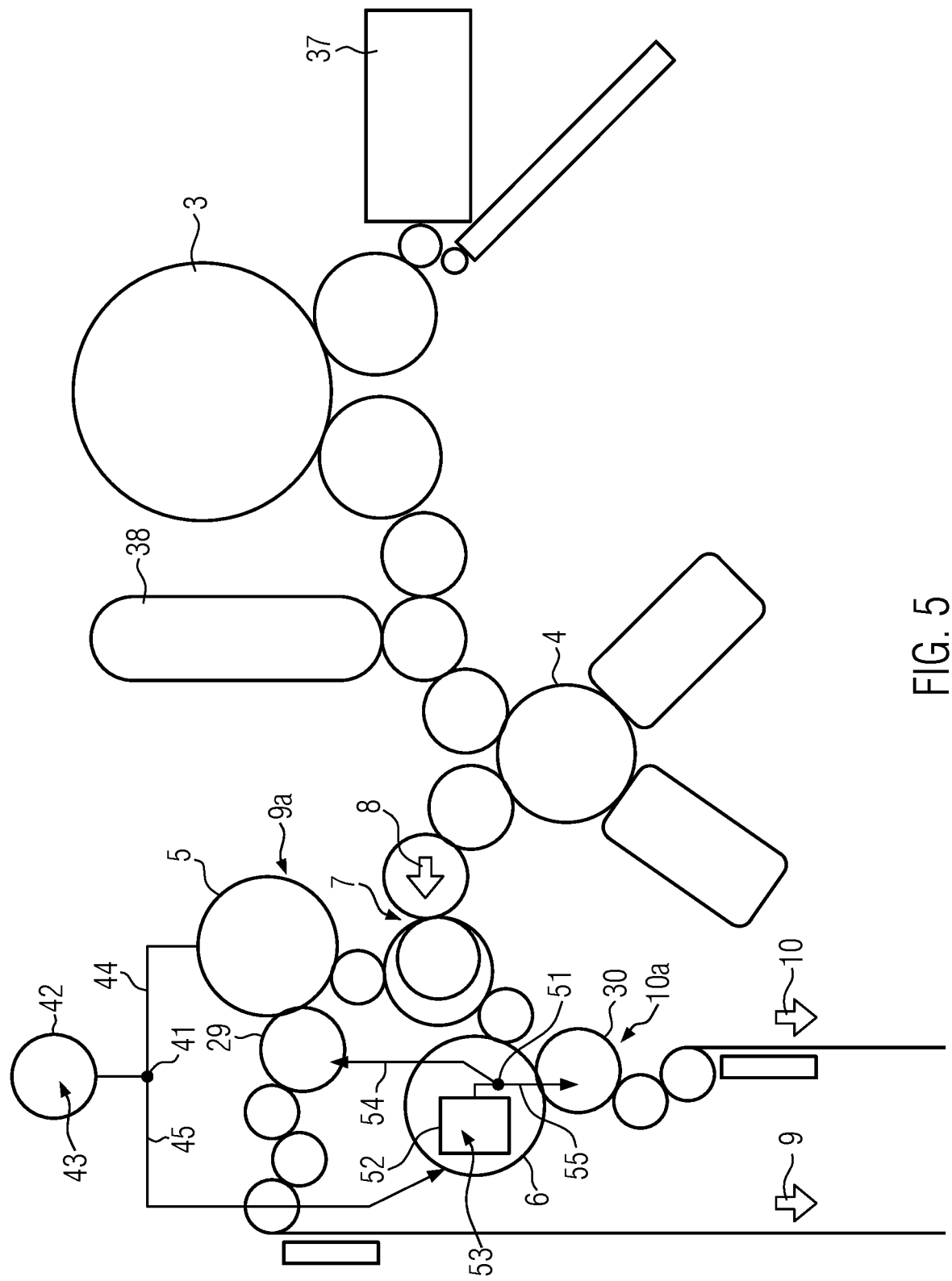
FIG. 5 shows a schematic top view onto a partial region of the filling system according to a third embodiment.

FIG. 5 shows an example of a variant of filling system 1 based on the configuration shown in FIG. 4, where a product distributor 41 is present for the product supply to filling machines 5, 6 and is connected on the inlet side to a product tank 42 with a common product store 43 and on the outlet side via supply lines 44, 45 to filling machines 5, 6. The liquid product is passed thereinto, for example, via an annular duct to the individual filling elements at filling positions 5a, 6a.

Product distributor 41 can be viewed, for example, to be a valve node for the filling elements. Product store 43 can also be made available from other central containers or lines via product distributor 41.

Shown in FIG. 5 are furthermore closing machines 29, 30 associated with fillers 5, 6 and a closure cap distributor 51 which is connected on the inlet side to a storage container 52 with a closure cap store 53. On the outlet side, closure cap distributor 51 is connected to closing machines 29, 30 by way of supply channels 54, 55.

Closure cap distributor 51 can be integrated, for example, into a cascade-like arrangement of supply channels 54, 55 which are then configured having a suitable downward inclination for transporting the closure caps to closing machines 29, 30.

With product distributor 41 and/or closure cap distributor 51 for fillers 5, 6, the complexity of the equipment and the operating complexity for the continuous provision of product supply 43 and closure cap supply 53 can be reduced as compared to the separate storage for individual fillers 5, 6.

Figure 6:
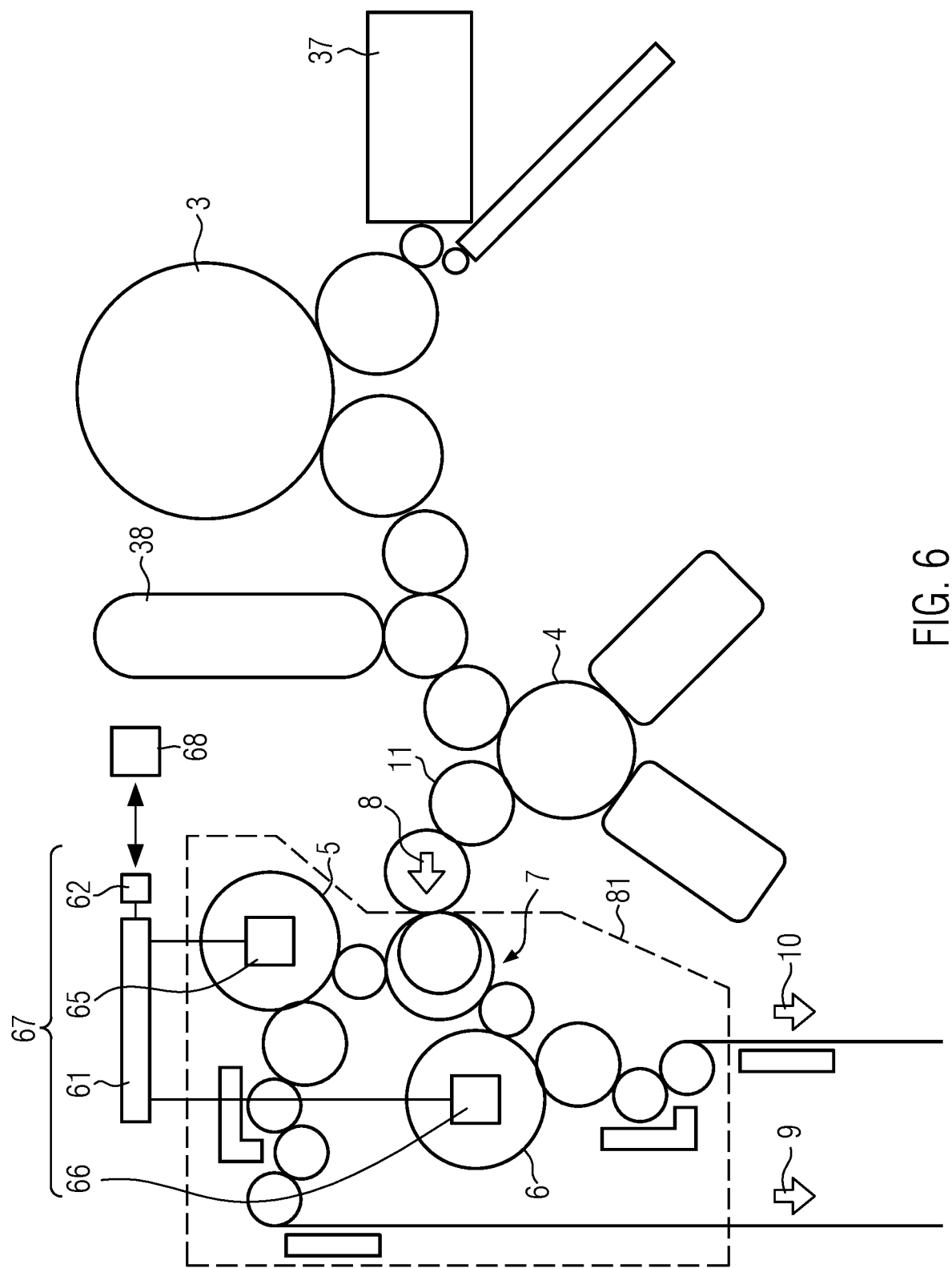
FIG. 6 shows a schematic top view onto a partial region of the filling system according to a fourth embodiment.

FIG. 6 shows an example of a variant of filling system 1 on the basis of the embodiment shown in FIG. 4 according to which fillers 5, 6 are combined in terms of conveyance to form a product unit that is to be controlled jointly. A common control device 61 with an input and output unit 62, for example, a touchscreen or the like, and control units 65, 66 which are present at blow molding-machines 5, 6 or are associated therewith elsewhere are shown schematically and by way of example. Control units 65, 66 can also control in a manner known in principle, for example, closing machines 29, 30 associated with fillers 5, 6.

Common control device 61 and control units 65, 66 subordinate thereto form a control module 67 which is integrated into a higher-level control system 68 of filling system 1 and can be operated as a single production unit.

In this way, fillers 5, 6 can be handled like a single machine in terms of control technology, such as for filling one and the same product, and can be operated in a simple manner at just one input and output device 62. This not only simplifies the operation of fillers 5, 6, but also enables the common storage of type parameters in common control device 61 and a simple transfer of such type parameters to fillers 5, 6. This means that operating errors due to possibly different entries for fillers 5, 6 can be prevented and the assignment of the type parameters to fillers 5, 6 can be automated.

In principle, it would also be conceivable to implement common control device 61 in one of control units 65, 66 and/or to automatically assign common control device 61 to that control device 65, 66 at which inputs, for instance, of type parameters, are currently being made.

Type parameters can be transferred in an automated manner between control units 65, 66 of fillers 5, 6. The above-mentioned operator concepts are advantageous depending, for example, on the spatial arrangement of fillers 5, 6 in machine block 2 and/or on the equipment of individual fillers 5, 6 with input/output units 62.

Also schematically indicated in FIG. 6 is a machine protection region 81 with a control circuit for fillers 5, 6 that is shared in terms of control technology with which impermissible operator intervention is prevented while fillers 5, 6 are running. If, for example, a switching contact integrated in the protective circuit at an intervention protection element, such as a safety partition, is interrupted, then all machines included in machine protection region 81 are stopped. In the example according to FIG. 6, these would be fillers 5, 6, closing machines 29, 30, and distribution device 7.

A machine protection region 81 with a common protective circuit for fillers 5, 6 is advantageous when the same product is to be filled in both fillers 5, 6 and no partial load operation is intended with only one of transport stretches 9a, 10a during a malfunction or service measure at one of fillers 5, 6.

In the case of a common machine protection region 81, it would also be conceivable to integrate the respective mechanical protection devices, such as protective doors, into a common housing for fillers 5, 6, closing machines 29, 30, and possibly also for distribution unit 7. These machines and assemblies would then be arranged in a common clean room environment or the like. Nonetheless, fillers 5, 6 could also be mechanically or spatially separated from one another by respective partition walls in order to create separate clean room environments for them, possibly with different clean room classes.

Figure 7:
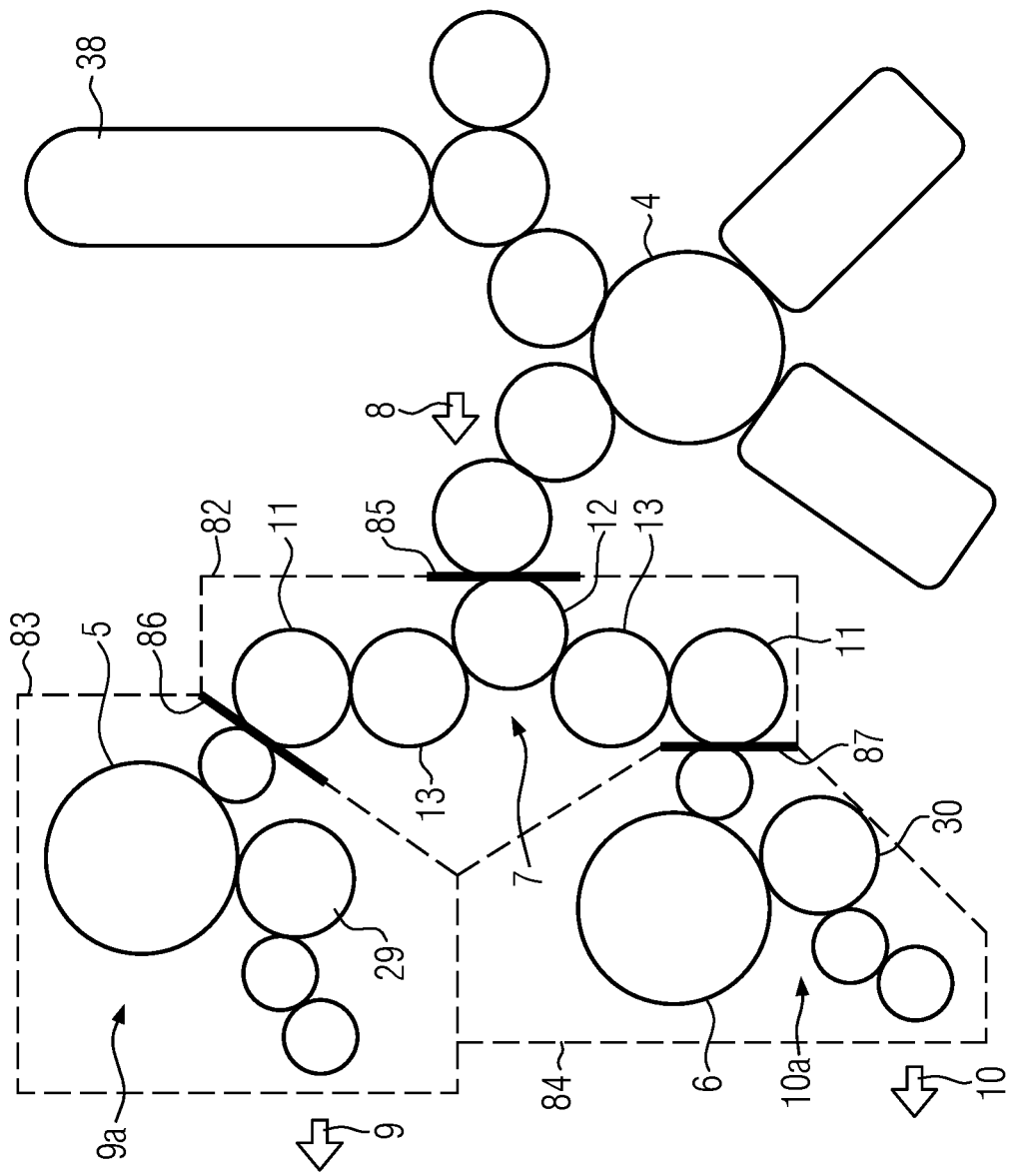
FIG. 7 shows a schematic top view onto a partial region of the filling system according to a fifth embodiment.

FIG. 7 shows, by way of example, a variant of the configuration shown in FIG. 4 in which additional transfer star wheels 11 are present in transport stretches 9a, 10a and separate machine protection regions 82, 83, 84 are formed by way of example. Blow-molding machine 3 is omitted in FIG. 7 for the sake of simplicity.

According thereto, a first machine protection region 82 with a separate protective circuit is associated with distribution device 7, a second machine protection region 83 with a separate protective circuit is associated with first filler 5, and a third machine protection region 84 with a separate protective circuit is associated with second filler 6. First machine protection region 82 is defined on the inlet side by a first separating partition 85, second machine protection region 83 on the inlet side by a second separating partition 86, and third machine protection region 84 on the inlet side by a third separating partition 87. Separating partitions 85, 86, 87 serve as mechanical protection against intervention and each comprise at least one switching contact (not shown) which, when respective separating partition 85, 86, 87 is opened, interrupts the associated protective circuit and stops the associated rotating assemblies.

With machine protection regions 82, 83, 84 separated from one another in this manner, fillers 5, 6 can be operated independently of one another, for example, for partial load operation of filling system 1 in which one of fillers 5, 6 is temporarily out of order due to malfunction or a maintenance measure. This means that filling system 1 can then continue to produce in the region of the uninterrupted protective circuits with reduced, for example, half of the output.

Separating partitions 85, 86, 87 represent in principle any mechanical elements for intervention protection, such as protective doors on housings or the like, provided that respective switching contacts are available for monitoring the closing status of the respective separating device (separating partition, protective door).

Figure 8:
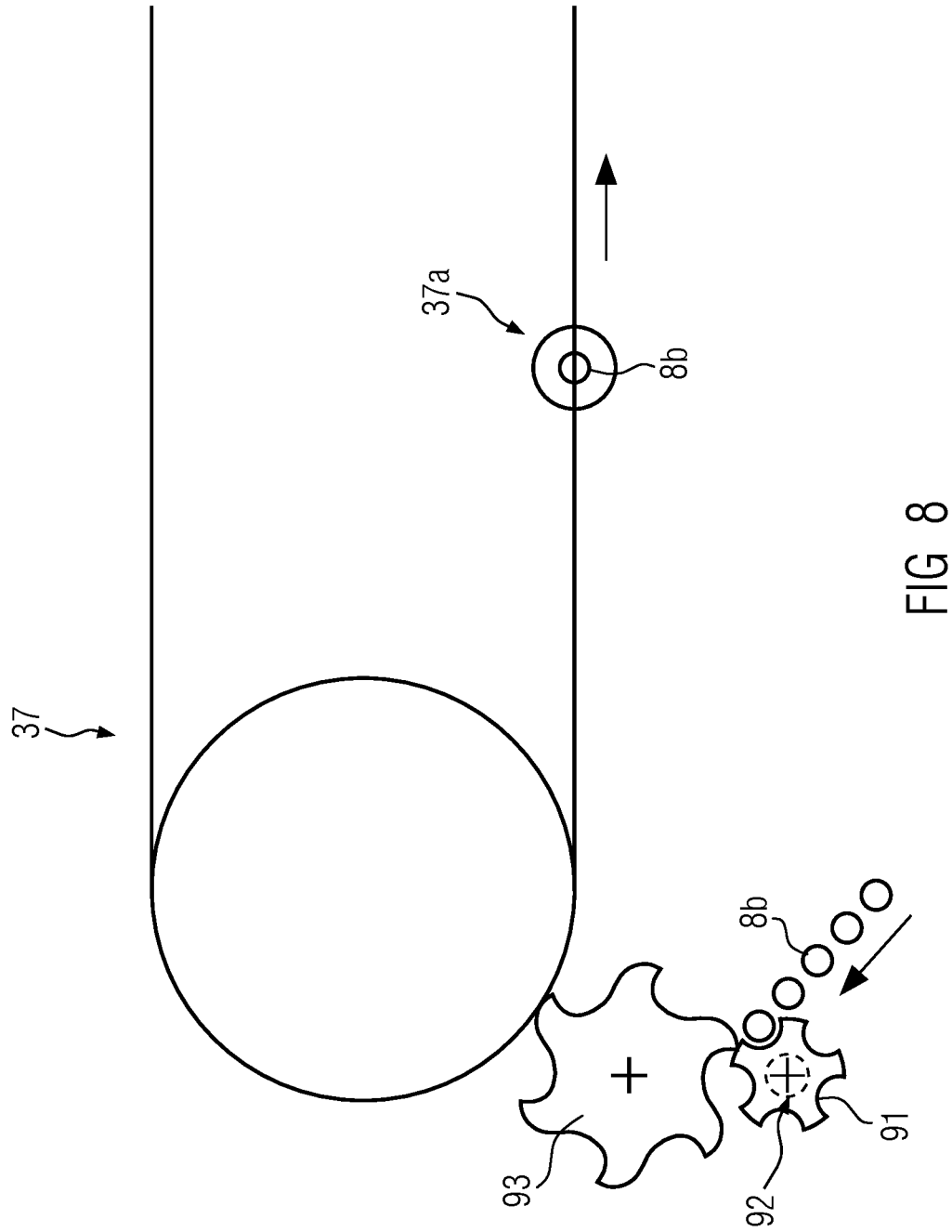
FIG. 8 shows a schematic top view onto the inflow region of a heating module of the filling system.

FIG. 8 shows a variant in which a locking star wheel 91 is present at heating module 37 on the inlet side and is driven by a stepper motor 92 (concealed in FIG. 8). Locking star wheel 91 is used for the machine-controlled release and blocking of the supply of preforms 8b into heating module 37. Likewise, the supply of preforms 8b can be clocked by way of stepper motor 92 in such a way that only every second circulating heating position 37a (only one of which is shown) of heating device 37 is populated with a preform 8b and, subsequently, also only every second circulating blowing position 3a of blow-molding machine 3.

Locking star wheel 91 can then be arranged upstream of a sawtooth star wheel 93 with which the transport separation of preforms 8b is created to match circulating heating positions 37a.

Stepper motor 92 there enables preforms 8b to be supplied precisely in terms of control technology and in easy-to-use manner. On the one hand, the supply is possible at a higher speed and precision than with known pneumatic locking devices. On the other hand, the supply of preforms 8b in a precise and reliable manner in terms of control-technology by way of stepper motor 92 makes it unnecessary to inspect the individual circulating heating positions 37a to determine whether or not they are populated with a preform 8b. This means that stepper motor 92 enables preforms 8b to be supplied in such a precise and reliable manner that additional sensors for the above verification of heating positions 37a and the associated complexity, both in terms of equipment and when setting up heating module 37, are unnecessary.

Filling system 1 can be operated, for example, as follows:

During normal production operation, type parameters can be entered at common control device 61 for filling a certain product in both fillers 5, 6 and transferred therefrom to control units 65, 66 of fillers 5, 6 and used there for the subsequent production operation when the transport is fully populated.

The type parameters can be transmitted between fillers 5, 6 in such a way that only one common input is necessary For this purpose, common control device 61 and/or separate control units 65, 66 of fillers 5, 6 can be used, possibly with a common representation or a separate representation with respect to control system 68 of filling system 1 as a whole.

A shift register can be divided between fillers 5, 6 duplicated in this manner and the production data of bottles 8a can be associated with filler 5, 6 respectively used.

A unique association of blow molds, labeling units, and filling elements is then possible along the production chain in filling system 1 in the sense of a tracking bottles 8a.

Preforms 8b are continuously supplied to all heating positions 37a of heating module 37 and single-lane flow of bottles 8 is created by blowing bottles 8a at all blowing positions 3a in blow-molding machine 3.

Flow of bottles 8 is continuously labeled at all labeling positions 4a of labeler 4 and supplied to distribution device 7. It distributes bottles 8a from every second transport position 7a alternately to first and second transport stretch 9a, 10a.

Bottles 8a could also be distributed at a switch star wheel by switching on a control curve such that all bottles 8a of flow of bottles 8 are diverted to the respective non-malfunctioning transport stretch 9a, 10a in the event of a malfunction or long-term production interruption at a transport stretch 9a, 10a. Blow-molding machine 3 and labeler 4 could then operate at half the speed when the transport is respectively fully populated.

When the transport is fully populated, initial transport separation 13b, 14b in transport stretches 9a, 10a is reduced to the transport separation of fillers 5, 6.

As a result, the rotational speeds and transport speeds of downstream units can be reduced in order to minimize the problem of the filled product spilling over.

Partial flows 9, 10 are filled in fillers 5, 6 at all filling positions 5a, 6a and are closed in downstream closing machines 29, 30.

Filled partial flows 9, 10 are combined at the combining device to form a common outflow 8', the latter is inspected, and bottles 8a that are not in proper order are discharged therefrom.

In the event of malfunctions, selective introduction of every second preform into the furnace is possible so that one filler can continue production if the other filler malfunctions, or pushing out every second preform downstream of the furnace is possible so that one filler can continue production if the other filler malfunctions.

In the event of a malfunction in one of two fillers 5, 6, heating module 37 can be run empty and bottles 8a produced in the process are temporarily channeled out onto buffer table 38 and temporarily stored there. After the malfunction has been rectified, buffer table 38 can be first run empty again in order to then seamlessly add the normal replenishment of bottles 8a in flow of bottles 8. Buffer table 38 can also be used for discharges for quality control during normal production.

If a filler 5, 6 and/or a closing machine 29, 30 malfunctions, then locking star wheel 91 at the inflow of heating module 37 can be stopped/blocked. Bottles 8a and preforms 8b associated with this filler 5, 6 can then be channeled out while other filler 5, 6 continues production.

Bottles 8a associated with a filler 5, 6 with a malfunction are to be channeled out, such as downstream of division star wheel 12. To prevent collisions between the latter and downstream separation delay star wheels 13, 14, the latter may co-rotate continuously. Bottles 8a can then be channeled out at a separation delay star wheel 13, 14 or at a transfer star wheel 11, if additionally present.

Filling system 1 and the filling method have been described by way of a division of one single-lane flow of bottles 8 into two partial flows 9, 10 or transport stretches 9a, 10a, respectively. In principle, however, a division of several flows of bottles 8 and/or to a larger number of partial flows 9, 10 or transport stretches 9a, 10a would also be conceivable, for example, by connecting in parallel or in series division star wheels 12 and a corresponding number of separation delay star wheels 13, 14 or the like receiving bottle 8a.

Flow of bottles 8 consists of bottles 8a made of plastic, such as PET, that are produced in blow molding machine 3. However, a respective division of other or additional bottles 8a from at least one single-lane flow of bottles 8 into partial flows 9, 10 in the manner described in principle is also conceivable.

The basis for this is always the division of flow of bottles 8 when the transport is fully populated immediately before bottles 8a are filled in order to satisfy the object described of improved filling/closing of bottles 8a and/or their handling immediately afterwards.

Figure 9:
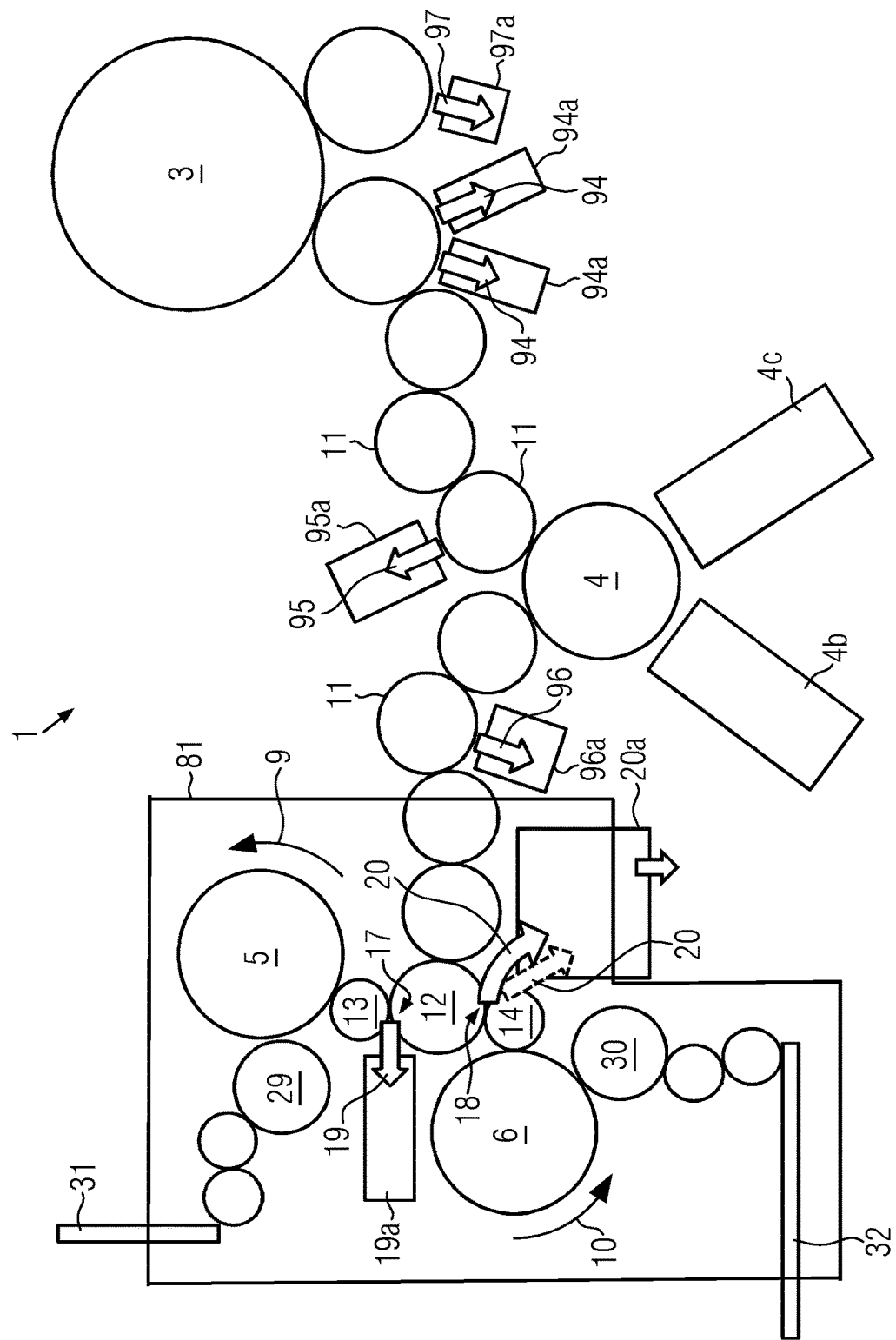
FIG. 9 shows a schematic top view onto a partial region of the filling system according to a sixth embodiment.

FIG. 9 shows, by way of example, a partial region of filling system 1 in a variant which, for example, can be based on at least one configuration illustrated in FIGS. 1 to 4. Individual associated elements, such as, for example, bottles 8a are possibly not shown, denoted, and/or described again for the sake of clarity. In these cases, reference is made to the above description and/or the associated figures.

The embodiment according to FIG. 9 accordingly comprises a first discharge device 19 and/or second discharge device 20 which can each be arranged in the region of distribution device 7 for each selectively discharging bottles 8a in the event of a malfunction of filler 5, 6 associated with respective bottles 8a.

In principle, it would also be conceivable to arrange first and/or second discharge device 19, 20 between distribution device 7 and one of fillers 5, 6 in order to discharge bottles 8a of respective partial flow 9, 10 in a selective manner, for example, to a respective interposed transfer star wheel 11 (see for example the system configuration according to FIG. 7).

In other words, first and/or second discharge device 19, 20 is arranged in the region of distribution device 7 or downstream thereof.

In addition to first and/or second discharge device 19, 20, several discharge devices 94, 95, 96 for bottles 8a and a discharge device 97 for preforms 8b are also shown schematically as block arrows upstream of distribution device 7.

An arrangement (shown in solid lines) in the region of at least one transfer point 17, 18 (FIG. 2) of distribution device 7 may be beneficial for first and/or second discharge device 19, 20, i.e. in the region of the respective bottle transfer from division star wheel 12 to immediately adjoining first or second separation delay star wheel 13, 14 or to an otherwise actively gripping transfer star wheel 11.

As can be seen, for example, in FIG. 2, bottles 8a can be discharged there in a simple manner by opening clamps 15, 16 of division star wheel 12 in a regular manner, but clamps 13a, 14a of subsequent first or second separation delay star wheel 13, 14 are not closed as a result of respective control activity. Since this prevents bottles 8a to be discharged from being received, they are instead ejected substantially tangentially starting out from respective transfer point 17, 18 and can drop and/or be guided into an associated collection container 19a, 20a of respective discharge device 19, 20.

An arrangement (shown in dashed lines) in the transport region of respective separation delay star wheel 13, 14 would be conceivable for first and/or second discharge device 19, 20, in principle according to the illustration in FIG. 2. In this case, clamps 13a, 14a (or the clamp of another actively gripping transfer star wheel 11) would have to be opened in a controlled manner at a suitable point in order to eject bottles 8a that have been regularly received at transfer point 17, 18 and supply them to associated collection container 19a, 20a.

Controlled actuation mechanisms for such opening of clamps 13a, 14a and/or for preventing them from closing at transfer points 17, 18 are in principle also practicable at separation delay star wheels 13, 14, as described with reference to circulating actuating elements 21, 22 and stationary (non-circulating) actuating elements 26, 27, in that non-circulating actuating elements are selectively moved to a position in which clamps 13a, 14a are opened or are kept open for discharge. For this purpose, actuators of known design can be present and controlled by machine accordingly.

An arrangement (not shown) at a passively gripping transfer star wheel 11 arranged in respective directly adjoining transport stretch 9a, 10a would also be conceivable for first and/or second discharge device 19, 20. Bottles 8a to be discharged could be pushed off from the former by way of appropriately machine-controlled pushers.

A first collection container 19a is shown by way of example within a machine protection region 81 around fillers 5, 6 and distribution device 7. Such an arrangement is possible in principle, but requires intervention in machine protection region 81 in order to empty collection container 19a and therefore stopping all of the machines protected by it. In addition, access for operating personnel can be difficult there for reasons of space.

However, at least one second collection container 20a may be beneficial as an alternative or in addition which can receive discharged bottles 8a within machine protection region 81 and which can be emptied (indicated schematically by a block arrow) from outside machine protection region 81.

It can also be beneficial, for example, to configure second discharge device 20 such that it can selectively discharge bottles 8a associated with first filler 5 as well as second filler 6, depending on which of fillers 5, 6 is malfunctioning and must therefore be stopped.

Firstly, the regular transfer of, for example, bottles 8a associated with second partial flow 10 to second separation delay star wheel 14 or instead a failure-related discharge of such bottles 8a at second transfer point 18 is possible for this purpose in the manner described above.

If, on the other hand, bottles 8a associated with first partial flow 9 are to be discharged at second transfer point 18 due to malfunction, then their transfer at first transfer point 17 to first separation delay star wheel 13 is first prevented. For this purpose, distribution device 7 is controlled in such a way that all of clamps 15, 16 of distribution star wheel 12 there are closed and clamps 13a of the first separation delay star wheel 13 are open.

There are no corresponding clamps 14a on second separation delay star wheel 14 for bottles 8a that are consequently transported onward at distribution star wheel 12 as an exception/due to a malfunction. If all of clamps 15, 16 of distribution star wheel 12 are open at second transfer point 18, then bottles 8a, initially associated with first partial flow 9 and transported onward beyond first transfer point 17 due to a malfunction, are also ejected there. Because of the absence of corresponding clamps 14a, no special control action for second separation delay star wheel 14 is required for this.

Depending on the arrangement of fillers 5, 6, a principally corresponding discharge of bottles 8a initially associated with first and/or second partial flow 9, 10 at first transfer point 17 is also conceivable, i.e. by opening all of respective clamps 15, 16 there.

Stationary (non-circulating) actuating elements 26, 27, for example, in the form of control cams, for opening first and second clamps 15, 16 of division star wheel 12 are to be arranged at transfer point 17, 18 respectively provided for such discharge.

Bottles 8a discharged in this manner may be collected in a second collection container 20a which can be emptied from outside machine protection region 81.

It is also conceivable to configure separate machine protection regions 82, 83, 84 for distribution device 7 and/or fillers 5, 6, as shown in principle in FIG. 7. Collection containers 19a which can be emptied within a specific machine protection region 82, 83, 84 as well as collection containers 20a which can be emptied from outside machine protection regions 82, 83, 84 could be arranged there.

At least one machine protection region 81 to 84 could in principle also create a hermetic seal for separating different atmospheres, for example, an aseptic production region within machine protection region 81 to 84 in comparison to an outside region with lower atmospheric requirements. Second collection container 20a, which can then optionally be emptied from the outside through a lock, may be beneficial for minimizing production interruptions in view of the typical aseptic production cycles of mostly over 100 hours and associated cleaning cycles lasting several hours.

As additionally shown in FIG. 9, there may be at least a third discharge device 94 for bottles 8a present at the outflow of blow-molding machine 3, a fourth discharge device 95 for bottles 8a at the inflow to labeler 4, and a fifth discharge device 96 for bottles 8a at the outflow of labeler 4, and/or a discharge device 97 for preforms 8b at the inflow to blow-molding machine 3. Discharge devices 94 to 97 are then associated with collection containers 94a, 95a, 96a and 97a (indicated schematically) for discharged bottles 8a or preforms 8, respectively.

Discharge devices 94 to 97 distributed upstream of distribution device 7 over the transport path of preforms 8b and bottles 8a shorten the transport paths and times until the respective discharge. Furthermore, bottles 8a can then be distributed over several collection containers 19a, 20a and 94a to 96a. This can be beneficial in the case of limited space and access, as well as in the case of large bottle formats, in order to be able to handle the relatively large number of bottles 8a to be discharged in the event of a malfunction and to minimize production waste.

In addition, it can be desirable to allow only as few bottles 8a as possible to run into machine protection region 81 to 84 since handling bottles 8a discharged there can be more complex and access to them can be restricted, depending on the arrangement of collection containers 19a, 20a.

Correspondingly beneficial is a common discharge device 20 for both fillers 5, 6 with a collection container 20a that is accessible from outside machine protection region 81 to 83 so that there is no need to intervene in machine protection region 81 to 83 and non-malfunctioning filler 5, 6 can continue operation.

It may be beneficial within machine protection region 81 to 84 to discharge bottles 8a in principle as close as possible to fillers 5, 6 since the number of (not dischargeable) bottles 8a still to be transported downstream to respectively malfunctioning filler 5, 6 is then minimized and filler 5, 6 concerned can be stopped as soon as possible.

Discharge devices 19, 20, 94 to 97 arranged at actively gripping star wheels, for example, at distribution star wheel 12 and/or separation delay star wheels 13, 14 comprise, for example, circulating actuating elements 21, 22 described and non-circulating (static) actuating elements 26, 27 which can then be moved back and forth in a machine-controlled manner between an active position that interacts with circulating actuating elements 21, 22 and a correspondingly inactive position.

Discharge devices 19, 20, 94 to 97 arranged at passively gripping star wheels, for example, at simple transfer star wheels 11, may comprise pushers that eject individual bottles 8a or preforms 8b from the clamps carrying them. Due to the numerous and relatively fast repetitive switching processes for ejecting every second bottle 8a (in the region of labeler 4, for example, over 100 bottles 8a per case of malfunction), electric servo direct drives can be suitable for the pushers, or alternatively also crankshaft drives with linearly oscillating pushers. Pneumatic drives would in principle also be possible, depending on the required switching cycles for discharging bottles 8a and/or preforms 8b.

The required synchronization of discharge devices 19, 20, 94 to 97 is possible by programming that is known in principle, for example, within the scope of control system 68 described with common control device 61 and/or individual control units 65, 66 of fillers 5, 6 and/or other control components.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A filling system for liquid products, comprising:
a machine block with a blow-molding machine for manufacturing bottles and for their provision as a flow of bottles, with a downstream labeler for labeling said flow of bottles, with a first transport stretch and a second transport stretch, each comprising a filler for filling said bottles, and with a distribution unit for division of said labeled flow of bottles to said first and second transport stretches when the transport is fully populated in such a way that said bottles can be labeled at all circulating labeling positions of said labeler and can be filled at the same time at all circulating filling positions of said fillers; and
partial outflow conveyors that are each connected downstream of said fillers, with a combining device for combining said first and second transport stretches to form a common outflow conveyor.

2. The filling system according to claim 1, further comprising a bypass device for selectively bypassing or inhibiting said combining device in order to provide separate outflows for said first and second transport stretches.

3. The filling system according to claim 1, where said distribution device comprises a division star wheel for alternately transferring every second bottle of said flow of bottles to said first and second transport stretches.

4. The filling system according to claim 3, where said division star wheel comprises clamps that can be actively opened by way of actuating elements circulating thereon and associated stationary actuating elements, and where said actuating elements associated with said first transport stretch are arranged on a first common actuation plane and said actuating elements associated with said second transport stretch are arranged on a second common actuation plane above or below said first actuation plane for actuating said clamps independently of one another with respect to said actuating planes.

5. The filling system according to claim 1, where said first and second transport stretches each comprise at least one separation delay star wheel for reducing a first transport separation during division of said flow of bottles to a comparably smaller second transport separation when said bottles are filled.

6. The filling system according to claim 1, where said machine block for said flow of bottles further comprises a buffer table branching off between said blow-molding machine and said labeler as a result of machine control.

7. The filling system according to claim 1, where said machine block further comprises at least one discharge device that is arranged at said distribution device and/or between the latter and one of said fillers and that is configured and machine-controlled in such a way that said bottles associated with one or said other filler can each be selectively discharged.

8. The filling system according to claim 7, further comprising at least one collection container which is configured to receive bottles discharged by way of said discharge device and to empty them from outside a machine protection region comprising said distribution device and/or at least one of said fillers.

9. The filling system according claim 1, further comprising a central product distributor for supplying said fillers with product to be filled from a common product store, and/or a central closure cap distributor for supplying closing machines associated with said fillers with closure caps from a common closure cap store.

10. The filling system according to claim 1, further comprising a control device for common control of said fillers and/or for synchronization/parameter transfer between control units for separate control of said fillers.

11. The filling system according to claim 1, further with a machine protection device with a machine protection region for common shielding of rotating assemblies of said fillers from operator intervention.

12. The filling system according to claim 1, further comprising a heating module for preforms connected upstream of said blow-molding machine with a locking star wheel on an inlet side for controlled release and blocking of the supply of said preforms, where said locking star wheel is driven by way of a stepper motor.

13. A method for filling liquid products into bottles, where said bottles are manufactured in a blow-molding machine and supplied as a single-lane flow of bottles to a labeler and labeled there at all circulating labeling positions, where said flow of bottles is thereafter divided onto a first transport stretch and a second transport stretch, and each partial flow is filled in a separately associated filler, where said bottles are transported in a machine block from manufacture to filling process, and said labeled flow of bottles is divided onto said first and second transport stretches when the transport is fully populated such that said bottles are filled at all circulating filling positions of said fillers.

14. The method according to claim 13, where said partial flows are combined to form a common outflow when said bottles are filled uniformly with the same product.

15. The filling system according to claim 14, where said partial flows are transported away separately when the filling process in said fillers differs from one another in terms of the product.

16. The method according to claim 13, where said transport separation of said partial flows is reduced prior to filling by separation delay during a circulating transport of said bottles.

17. The method according to claim 13, where said fillers are commonly controlled by an operator by entering uniform type parameters and using them by way of an automated transfer of type parameters to said fillers from one common control device.

18. The method according to claim 17, where said automated transfer of type parameters is from one filler to the other.

19. The method according to claim 13, where, responsive to a malfunction of one of said fillers, preforms associated with the latter are stopped or channeled out by machine, bottles associated therewith are temporarily stored prior to labeling and/or are discharged upstream of said malfunctioning filler from said respective partial flow, and where bottles already produced/labeled are filled in a properly operating filler.

20. The method according to claim 19, where, responsive to the malfunction of one of said fillers, bottles associated with the latter are discharged from said respective partial flow upstream and/or in a region of a distribution star wheel for division of said flow of bottles onto said partial flows.

* * * * *